(12) United States Patent
Itou

(10) Patent No.: US 7,642,922 B2
(45) Date of Patent: Jan. 5, 2010

(54) DRIVE SUPPORT APPARATUS FOR A MOVABLE BODY

(75) Inventor: Taisuke Itou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 266 days.

(21) Appl. No.: 11/521,384

(22) Filed: Sep. 15, 2006

(65) Prior Publication Data
US 2007/0268146 A1 Nov. 22, 2007

(30) Foreign Application Priority Data
May 19, 2006 (JP) ............................. 2006-140631

(51) Int. Cl.
*G08B 23/00* (2006.01)
(52) U.S. Cl. .................. 340/576; 340/575; 701/36; 434/64
(58) Field of Classification Search ............... 340/576, 340/575, 439, 573.1; 180/272; 701/36; 434/64
See application file for complete search history.

(56) References Cited

U.S. PATENT DOCUMENTS

| | | | | |
|---|---|---|---|---|
| 5,694,116 | A * | 12/1997 | Kojima ........................ 340/576 |
| 5,813,989 | A * | 9/1998 | Saitoh et al. ................. 600/484 |
| 6,351,698 | B1 | 2/2002 | Kubota et al. ................. 701/51 |
| 6,957,142 | B2 | 10/2005 | Entenmann .................. 701/117 |
| 2002/0024444 | A1* | 2/2002 | Hiyama et al. .............. 340/576 |
| 2002/0120374 | A1* | 8/2002 | Douros et al. ................. 701/29 |
| 2005/0030184 | A1* | 2/2005 | Victor ......................... 340/576 |
| 2007/0013498 | A1 | 1/2007 | Knoll et al. .................. 340/438 |

FOREIGN PATENT DOCUMENTS

| | | |
|---|---|---|
| DE | 100 01 261 | 7/2001 |
| DE | 101 53 302 | 5/2003 |
| DE | 103 39 647 | 3/2005 |
| JP | 6-239186 | 8/1994 |
| JP | 8-329400 | 12/1996 |
| JP | 2000-213945 | 8/2000 |
| JP | 2001-14599 | 1/2001 |
| JP | 2002-127780 | 5/2002 |

OTHER PUBLICATIONS

Communication from German Patent Office mailed on Feb. 22, 2007 received on corresponding application, 3 pages.

* cited by examiner

*Primary Examiner*—George A Bugg
*Assistant Examiner*—Hongmin Fan
(74) *Attorney, Agent, or Firm*—Fujistu Patent Center

(57) ABSTRACT

A drive support apparatus that performs an interaction with a driver with respect to awareness of safe driving so as to make the driver drive safely. The drive support apparatus includes: a driving state detecting portion for acquiring driving state information including at least either information about a traveling situation of the movable body or information about a driving operation from an in-vehicle sensor; a driver information storing portion for storing awareness information representing digitized awareness of the driver with respect to safe driving; an interaction controlling portion for generating a question for checking the driver's awareness with respect to safe driving when the driving state information and the awareness information satisfy predetermined interaction-start conditions, outputting the question as a synthesized voice, and recognizing an answer content from a voice of the driver to the question; and an awareness information generating portion for updating the awareness information in accordance with the answer content recognized by the interaction controlling portion.

9 Claims, 4 Drawing Sheets

| Steering wheel angle (°) | Recommended speed (km/h) |
|---|---|
| 20~30 | 50 |
| 30~40 | 40 |
| 40~50 | 30 |
| 50~60 | 20 |

FIG.4A

| Curve radius (m) | Recommended speed (km/h) |
|---|---|
| 40~50 | 50 |
| 30~40 | 40 |
| 20~30 | 30 |
| 10~20 | 20 |

FIG.4B

DRIVE SUPPORT APPARATUS FOR A MOVABLE BODY

BACKGROUND OF THE INVENTION

1. Field of the Invention

The present invention relates to a drive support apparatus used for a car navigation system or the like in a movable body such as an automobile. Particularly, the present invention relates to a drive support apparatus for detecting awareness of a driver with respect to safe driving.

2. Description of Related Art

Conventionally, various techniques have been proposed to support driving of movable bodies such as vehicles, and the techniques include detecting a traveling state of the movable body and/or the state of the driver, and giving warning or advice to the driver in accordance with the states.

For example, JP 2002-127780 A discloses a vehicle alarm system that determines whether the vehicle is currently under a particular situation in which the vehicle is liable to cause an accident, on the basis of a situation detected by a situation detecting means for detecting the current situation of the vehicle, and when the vehicle is under the particular situation, the vehicle alarm system determines whether an alarm should be outputted, on the basis of respective driving characteristic values according to the levels of safety check, driving concentration, and operational aptitude of the driver, all of which are stored in a non-volatility memory.

JP 2000-213945 A discloses a navigation system with interactive function. It warns or rebukes the driver when detecting degradation in judgment of the driver, or determines the situation of the automobile on the basis of the detection signals from a sensor loaded in the automobile, and gives advice or instruction for driving on the basis of the determination.

Other known systems include an in-vehicle information system (JP H08-329400 A) that provides topics as a time-killer for the driver or prevents dozing of the driver, and also in-vehicle electronic equipment (JP H06-239186 A) that prevents dozing and concurrently enables language learning.

SUMMARY OF THE INVENTION

However, in the above-mentioned conventional systems regarding a safety check or the like during a travel of a vehicle, notification of information for the drive support is one-sided from the system to the driver. In other words, the system cannot detect whether the driver listens to the information notification for the drive support. In addition, the system cannot detect the level of awareness of the driver with respect to safe driving.

It is effective for the driver to be aware of traffic laws or the like correctly in order to accomplish safe driving. For example,-when the driver drives at a speed over the speed limit, the driver is asked whether he acknowledges the speed limit so as to caution the driver to be aware of the speed limit and to improve safe driving.

Therefore, with the foregoing in mind, it is an object of the present invention to provide a drive support apparatus for a movable body to accomplish safe driving through an interaction with the driver with respect to awareness of safe driving.

For achieving the above-mentioned object, a drive support apparatus for a movable body according to the present invention includes: a driving state detecting portion for acquiring driving state information comprising at least either information about a traveling situation of the movable body or information about a driving operation of the driver, from a sensor provided in the movable body during a drive of the movable body; a driver information storing portion for storing awareness information that represents a digitized awareness of the driver with respect to safe driving; an interaction controlling portion for deciding whether or not to start an interaction with the driver depending on whether the driving state information and the awareness information satisfy a predetermined interaction-start conditions, generating a question for checking the awareness of the driver with respect to safe driving in a case of a decision that the interaction should be started, outputting the generated question as a synthesized voice, recognizing an answer content from a voice of the driver to the question, generating advice for safe driving to the answer, and outputting the generated advice as a synthesized voice; and an awareness information generating portion for updating the awareness information in accordance with the answer content recognized by the interaction controlling portion.

In the above configuration, the driving state detecting portion acquires driving state information from a sensor provided in the movable body. The interaction controlling portion generates a question for checking the awareness of the driver with respect to safe driving in a case where the driving state information and the awareness information satisfy predetermined interaction-start conditions, and outputs the thus generated question as a synthesized voice. Since an interaction with the driver for checking the driver's awareness with respect to safe driving can be started at a proper timing predetermined under an interaction-start condition in this manner, driver's awareness with respect to safe driving can be cautioned. Moreover, since the interaction controlling portion recognizes the answer content from the voice of the driver to the above-mentioned question, and since the awareness information generating portion updates the awareness information stored in the driver information storing portion in accordance with the answer content recognized by the interaction controlling portion, sufficiency of the interaction-start condition changes in accordance with the level of the driver's awareness, the interaction can be started at a proper timing corresponding to the level of the driver's awareness.

It is preferable that the drive support apparatus for a movable body according to the present invention includes further a safe-driving information storing portion for storing safe driving information comprising information that represents a condition for safe driving, the awareness information generating portion decides whether the answer content recognized by the interaction controlling portion is correct or not, on the basis of the answer content and the safe driving information; when the answer content is decided as correct, the awareness information generating portion decides whether or not to update the awareness information stored in the driver information storing portion depending on whether the answer content and the driving state information satisfy a predetermined awareness information updating condition, and in a case a decision is that the awareness information should be updated, the awareness information generating portion updates the awareness information to a value representing a state of a higher awareness, and when the answer content is decided as incorrect, the awareness information generating portion updates the awareness information stored in the driver information storing portion to a value representing a state of a lower awareness.

According to this configuration, when the answer content is incorrect, the awareness information is updated to a value representing a state of a lower awareness. That is, when the level of awareness of the driver with respect to safe driving is low, the value of the awareness information is updated accordingly. Only when the answer content is correct and a predetermined awareness information updating condition is satisfied, the awareness information is updated to a value representing a state of a higher awareness. That is, even when the driver is aware of safe driving correctly, if the predetermined awareness information updating condition is not satisfied, the value of the awareness information is not updated to a value representing a state of higher awareness. For the awareness information updating condition, for example, a condition for deciding whether safe driving is performed actually is used. Thereby, the level of the driver's awareness can be reflected properly on the awareness information.

Regarding the drive support apparatus for a movable body, the movable body is an automobile, for example.

It is further preferable in the drive support apparatus for a movable body according to the present invention that the awareness denotes a level of awareness of the driver with respect to a speed limit, and the driving state detecting portion acquires a traveling speed of the movable body, as driving state information from the sensor of the movable body. Thereby, the level of the driver's awareness with respect to the speed limit can be detected.

It is preferable in the drive support apparatus for a movable body according to the present invention that the awareness denotes a level of awareness of the driver with respect to an inter-vehicle distance, and the driving state detecting portion acquires an inter-vehicle distance from a movable body ahead, as driving state information from the sensor of the movable body. Thereby, the level of the driver's awareness with respect to the inter-vehicle distance can be detected.

It is preferable in the drive support apparatus for a movable body according to the present invention that the awareness denotes a level of awareness of the driver with respect to a timing for operating a direction indicator, and the driving state detecting portion acquires information that represents a timing for operating the direction indicator, as driving state information from the sensor of the movable body. Thereby, the level of the driver's awareness with respect to the timing for properly operating the direction indicator can be detected.

It is preferable in the drive support apparatus for a movable body according to the present invention that the awareness denotes a level of awareness of the driver with respect to a deceleration at a time of passing a curve or an intersection, and the driving state detecting portion acquires a traveling speed at a time of passing the curve or the intersection, as driving state information from the sensor of the movable body. Thereby, the level of the driver's awareness with respect to the deceleration at passing a curve or an intersection can be detected.

It is preferable in the drive support apparatus for a movable body according to the present invention that the awareness denotes a level of awareness of the driver respectively with respect to at least two evaluation items selected from the group consisting of four evaluation items of a speed limit, an inter-vehicle distance, a timing for operating a direction indicator, and a deceleration at a time of passing a curve or an intersection; corresponding to the evaluation items, the driving state detecting portion acquires driving state information of at least two from the speed limit of the movable body, the inter-vehicle distance from a movable body ahead, the timing for operating a direction indicator, and the deceleration at the time of passing a curve or an intersection, from the sensor of the movable body; and when plural evaluation items satisfy simultaneously the interaction-start conditions, the interaction controlling portion generates a question for checking the awareness with respect to an evaluation item for which the driver's awareness has been determined as the lowest. Thereby, the driver's awareness can be cautioned preferentially for an evaluation item for which the awareness is low.

It is preferable in the drive support apparatus for a movable body according to the present invention that the sensor comprises a sensor for detecting a sign of dozing of the driver, and when the dozing of the driver is detected by the sensor, the interaction controlling portion starts an interaction with the driver irrespective of satisfaction of the interaction-start conditions. Thereby, drowsy-driving can be prevented effectively.

A program recording medium according to the present invention is a recording medium on which a program is recorded, and the program allows a computer to execute: a driving state detection procedure for acquiring driving state information comprising at least either information about a traveling situation of the movable body or information about a driving operation of the driver, from a sensor provided in the movable body during a drive of the movable body; an interaction control procedure for referring to a driver information storing portion that stores awareness information representing digitized awareness of the driver with respect to safe driving, deciding whether or not to start an interaction with the driver depending on whether the driving state information and the awareness information satisfy the interaction-start conditions, generating a question for checking the awareness of the driver with respect to safe driving in a case of decision that the interaction should be started, outputting the generated question as a synthesized voice, recognizing an answer content from a voice of the driver to the question, generating advice for safe driving to the answer, and outputting the advice as a synthesized voice; and awareness information generation procedure for updating the awareness information in accordance with the answer content recognized through the interaction control procedure.

According to the present invention, since the drive support apparatus can grasp the awareness of the driver with respect to safe driving and can cope with an inferior sense, a support for safe driving is available.

BRIEF DESCRIPTION OF THE DRAWINGS

FIGS. 4A and 4B are explanatory views showing one example of safe driving information stored in a drive support system according to one embodiment of the present invention.

DETAILED DESCRIPTION OF THE INVENTION

Hereinafter, the present invention will be described by way of illustrative embodiments for a case of being applied to a drive support system for an automobile with reference to the attached drawings.

Figure 1:
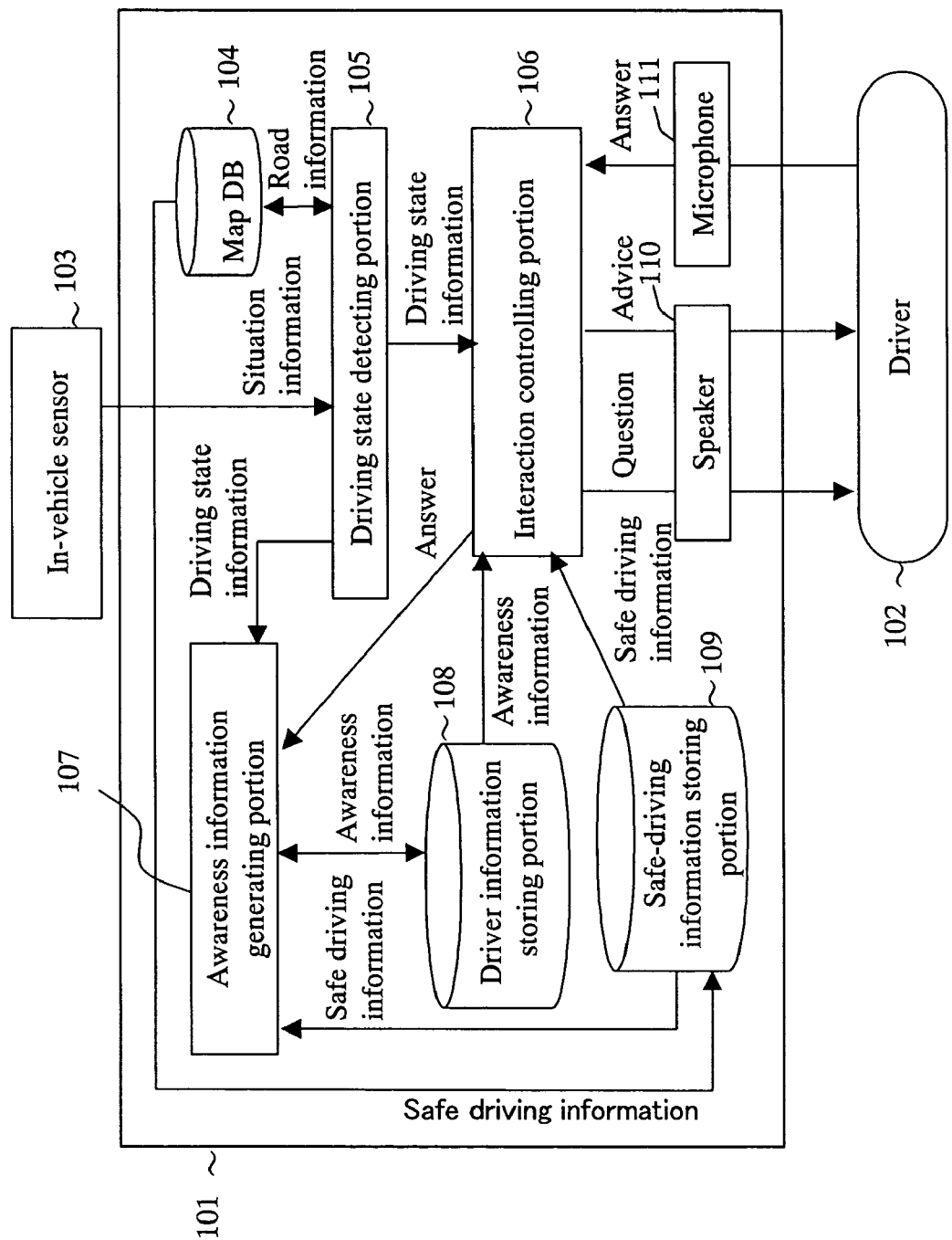
FIG. 1 is a block diagram showing a functional configuration of a drive support system for an automobile according to one embodiment of the present invention.

FIG. 1 is a block diagram showing a functional configuration of a drive support system 101 for an automobile according to one embodiment of the present invention. A drive support system applied with the present invention can have other arbitrary drive support functions not shown in FIG. 1.

The drive support system 101 as shown in FIG. 1 has a map database 104, a driving state detecting portion 105, an interaction controlling portion 106, an awareness information generating portion 107, a driver information storing portion 108, a safe-driving information storing portion 109, a speaker 110, and a microphone 111. Though FIG. 1 shows an example of a configuration where the map database 104 is provided in the drive support system 101, such a map database can be provided outside the drive support system 101 alternatively. The drive support system 101 becomes feasible by means of an in-vehicle computer. That is, the driving state detecting portion 105, the interaction controlling portion 106 and the awareness information generating portion 107 are functional blocks to become feasible by executing a predetermined program by a CPU of the in-vehicle computer, but hardware corresponding to each of the parts does not always exist. The map database 104, the driver information storing portion 108, and the safe driving information 109 become feasible by a memory (for example, hard disks and mobile media) that can be accessed from the in-vehicle computer.

The driving state detecting portion 105 detects the driving state of the automobile at a predetermined time interval on the basis of road information obtained from the map database 104 and various situation information obtained from various in-vehicle sensors 103 provided at respective parts of the automobile, and outputs the thus detected information representing the driving state, as the driving state information, to the interaction controlling portion 106 and the awareness information generating portion 107. The in-vehicle sensor 103 includes various sensors for detecting a traveling state of the automobile and the operation state by the driver, and furthermore, GPS (Global Positioning System) for grasping the current position or the like of the automobile, a temperature sensor and an optical sensor or the like for detecting temperature, weather condition and the like, and a range finding system for measuring an inter-vehicle distance from the vehicle ahead. Range finding systems that can be applied to the present invention are not limited in the principle for measurement of the distances, and any arbitrary systems such as a range finding system based on laser, a range finding system based on image processing, a range finding system based on wireless communications with vehicles ahead, and a range finding system based on a millimeter wave radar, can be applied. Examples of the road information obtained from the map database 104 include geographical information of the roads (for example, positions of intersections, radii of curves and the like) and speed limits for the respective roads. The situation information obtained from the in-vehicle sensor 103 includes information representing a traveling speed, an inter-vehicle distance, and the operation condition for a direction indicator, for example.

Figure 2:
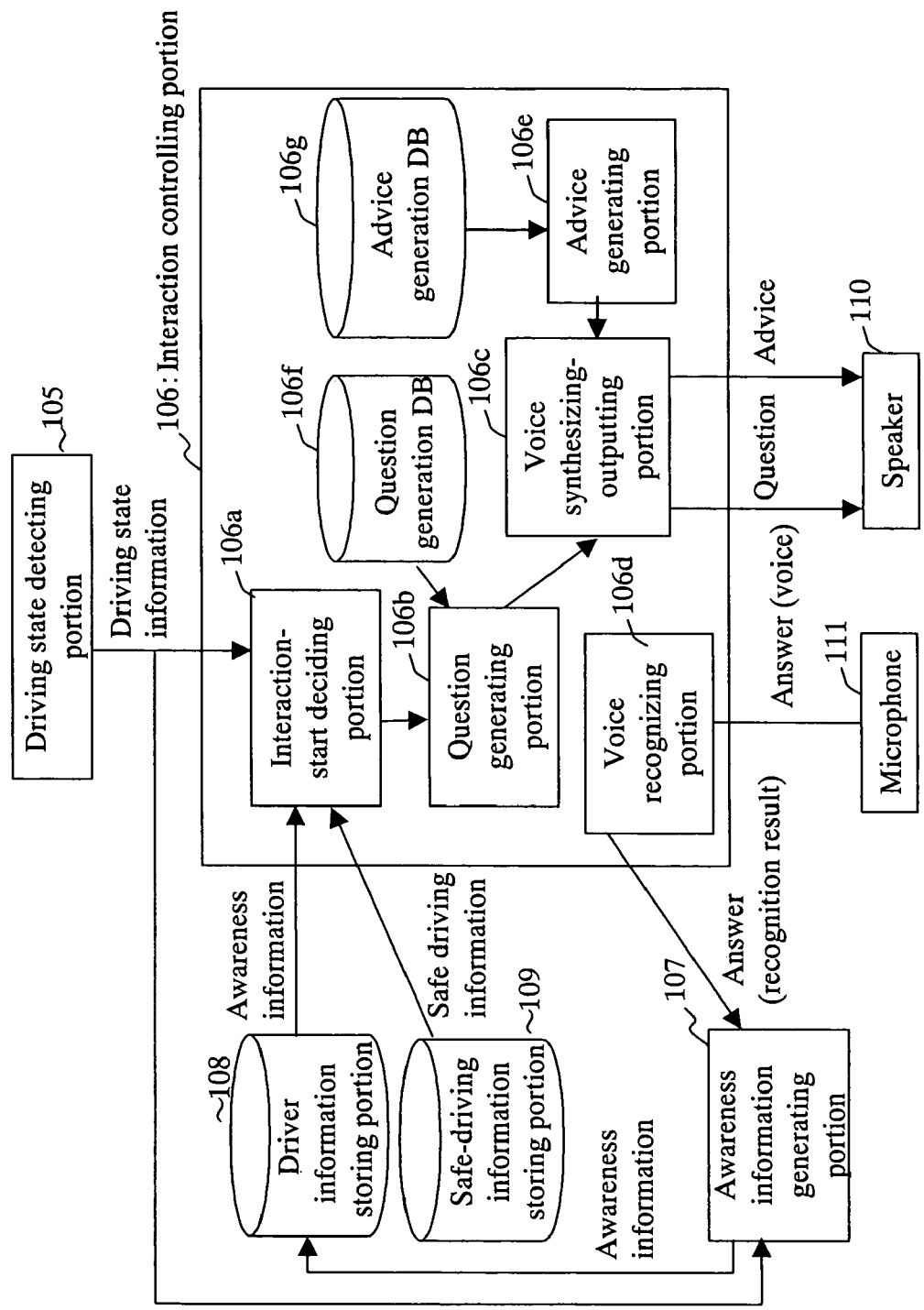
FIG. 2 is a block diagram showing a detailed functional configuration of an interaction controlling portion loaded in a drive support system according to one embodiment of the present invention.

FIG. 2 is a block diagram showing a more detailed functional configuration of the interaction controlling portion 106. The interaction controlling portion 106 includes, as shown in FIG. 2, an interaction-start deciding portion 106a, a question generating portion 106b, a voice synthesizing-outputting portion 106c, a voice recognizing portion 106d, an advice generating portion 106e, a question generation database 106f, and an advice generation database 106g in order to perform a voice recognition procedure and a voice synthesizing procedure and also perform a voice interaction with the driver 102 through the speaker 110 and the microphone 111. Since known and arbitrary voice recognition procedure and voice synthesizing procedure can be used for the voice recognition procedure and the voice synthesizing procedure through the voice recognizing portion 106d and the voice synthesizing-outputting portion 106c of the interaction controlling portion 106, the detailed explanation will be omitted here.

The awareness information generating portion 107 receives from the interaction controlling portion 106 an answer of the driver to the question, and at the same time, it receives driving state information concerning the driving state of the automobile from the driving state detecting portion 105, and generates "awareness information" represented with numerical values the awareness of the driver with respect to safe driving. The driver information storing portion 108 stores the awareness information generated by the awareness information generating portion 107. In the driver information storing portion 108, the awareness information and also a history of the driving state information obtained from the driving state detecting portion 105, the statistical data and the like can be stored as data representing the drive habit of the driver 102. The safe-driving information storing portion 109 stores information desired for safe driving and various kinds of threshold information regarding awareness information or the like, as safe driving information.

Figure 3:
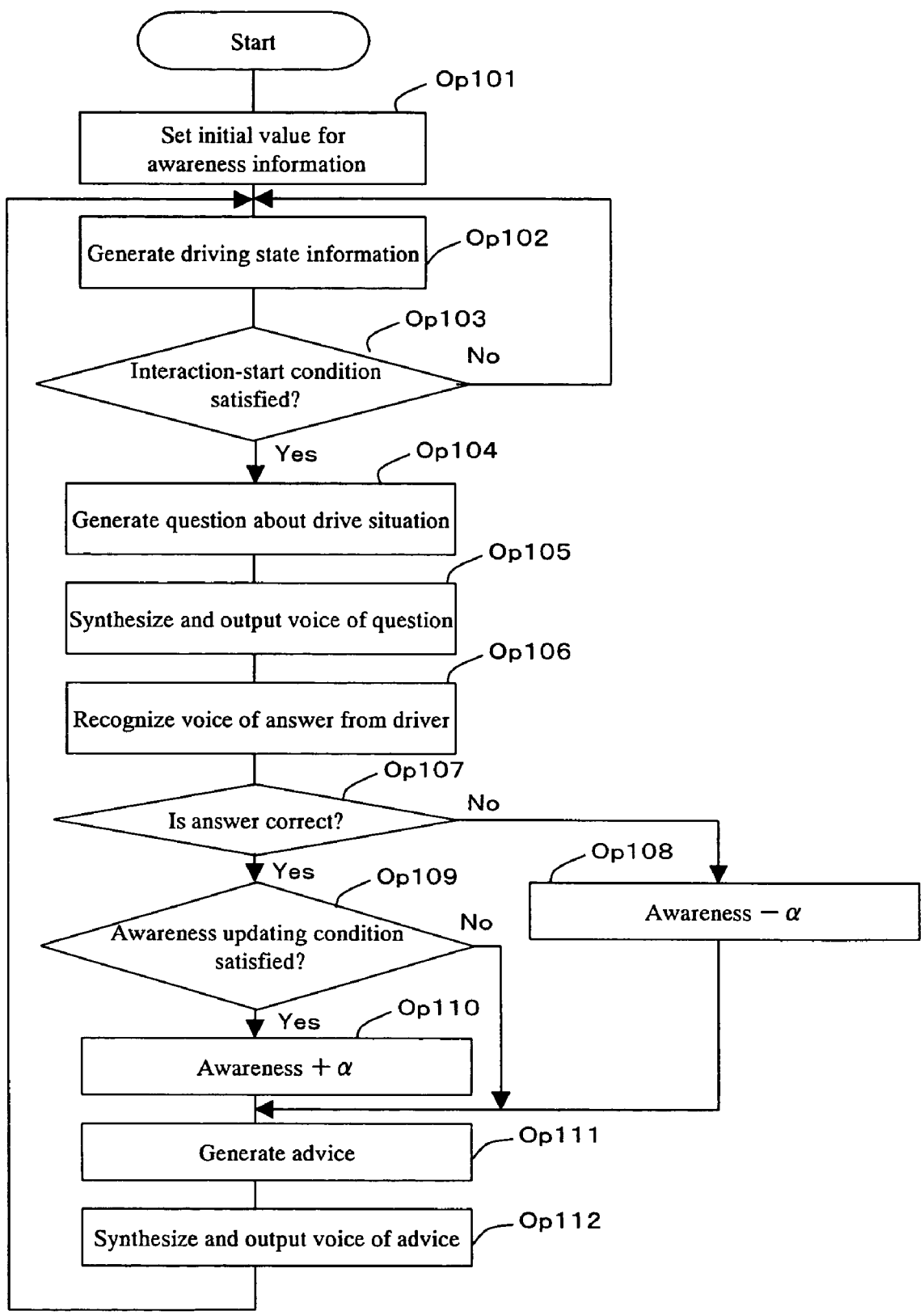
FIG. 3 is a flow chart showing operations of a drive support system according to one embodiment of the present invention.

Here, the operations of the drive support system 101 will be described with reference to FIG. 3. FIG. 3 is a flow chart showing operations of the drive support system 101.

As shown in FIG. 3, for example, at the time of activating the drive support system 101 or the like, the awareness information generating portion 107 sets a value of awareness information (being stored in the driver information storing portion 108) representing as numerical values the awareness of the driver with respect to safety, as a predetermined initial value $v_0$ (for example, 0) (Op101). Subsequently, the driving state detecting portion 105 generates driving state information at a predetermined time interval, based on the situation information obtained from the in-vehicle sensor 103 and road information obtained from the map database 104, and outputs the information to the interaction controlling portion 106 and also to the awareness information generating portion 107 (Op102). Then, the interaction-start deciding portion 106a of the interaction controlling portion 106 decides whether an interaction should be started, every time receiving the driving state information outputted from the driving state detecting portion 105 (Op103), depending on whether the driving state information and the awareness information satisfy predetermined interaction-start conditions.

When the decision result in Op103 is Yes, the question generating portion 106b of the interaction controlling portion 106 refers to the question generation database 106f so as to generate a question about the driving state (Op104), and the voice synthesizing-outputting portion 106c performs a voice synthesizing procedure so as to make a readout voice of the question generated in Op104, and outputs the voice through the speaker 110 (Op105).

And, when the driver 102 answers with voice to the question outputted as a voice in Op105, the voice recognizing portion 106d receives the voice of the driver 102 through the microphone 111 and performs a voice recognition procedure, thereby recognizing the answer content from the answering voice (Op106). The interaction controlling portion 106 sends the thus recognized answer to the awareness information generating portion 107.

The awareness information generating portion 107 compares the answer sent from the interaction controlling portion 106 and the safe driving information obtained from the safe-driving information storing portion 109 so as to decide whether the answer from the driver 102 to the question about the driving situation is correct or not (Op107). When the answer from the driver 102 is decided as incorrect (the decision result in Op107 is No), the awareness information generating portion 107 sets a value obtained by subtracting a predetermined value α from the value of the awareness information stored in the driver information storing portion 108, as a new awareness information value, and stores the new value in the driver information storing portion 108 (Op108).

When the answer from the driver 102 is decided as correct (the decision result in Op107 is Yes), the awareness information generating portion 107 decides whether the condition for updating the awareness information is satisfied or not, on the basis of the answer provided by the interaction controlling portion 106 and from the driving state information provided by the driving state detecting portion 105 in Op102 (Op109). In a case of a decision that the condition for updating the awareness information is satisfied (the decision result in Op109 is Yes), the awareness information generating portion 107 sets a value obtained by adding a predetermined value α to the awareness information value stored in the driver information storing portion 108, as a new awareness information value, and stores the new value in the driver information storing portion 108 (Op110). In a case of a decision that the condition for updating the awareness information is not satisfied (the decision result in Op109 is No), the awareness information generating portion 107 will not update the value of the awareness information.

Finally, the advice generating portion 106e of the interaction controlling portion 106 refers to the advice generation database 106g on the basis of the driving state information so as to generate advice to the driver 102 (Op111), the voice synthesizing-outputting portion 106c synthesizes a readout voice of this advice, and outputs the voice through the speaker 110 (Op112).

By repeating the above-mentioned procedures, the drive support system 101 according to this embodiment can interact with the driver 102 so as to detect the awareness of the driver 102 with respect to safe driving and give proper advice.

Specific examples of the drive support system 101 will be described below for explaining the above-mentioned Op101-112 in detail.

EXAMPLE 1

The following description is for Example 1 where the drive support system 101 detects the driver's awareness with respect to the speed limit on the road in the traveling.

In this Example, the level that the driver is aware of the speed limit of the road in the traveling is defined as "speed limit awareness", which is digitized as "speed limit awareness information" and stored in the driver information storing portion 108. In this Example, the speed limit awareness information can take an initial value $v_0$ being set to "0" in Op101, and the value can be selected from a range of −20 to 10. It should be noted that this is just an example, and the embodiment of the present invention will not be limited to the specific examples. A larger value of the speed limit awareness information indicates that the driver is aware of the speed limit more correctly.

In the drive support system 101 of this Example, in Op102, the driving state detecting portion 105 outputs the value of the traveling speed obtained from the in-vehicle sensor 103, as the driving state information, to the interaction controlling portion 106 and the awareness information generating portion 107. For example, when the traveling speed is 60 km/h, the value of the driving state information is set to "60". And the driving state detecting portion 105 acquires the positional information under traveling from the GPS included in the in-vehicle sensor 103, and acquires, using the positional information, the speed limit of the road under traveling, from the map database 104 and the traffic information, and it stores the thus acquired speed limit in the safe-driving information storing portion 109, as one piece of the safe driving information.

In Op103, the interaction-start deciding portion 106a of the interaction controlling portion 106 sets the three conditions (a)-(c) below as interaction-start conditions, and starts interaction with the driver 102 when all of these three conditions are satisfied.

(a) the traveling speed exceeds the speed limit
(b) a certain time ($t_1$) has passed from the last question
(c) the state where the following Formula 1 is established continues for at least a predetermined time ($t_2$)

('traveling speed'−'speed limit')−'speed limit awareness information'≧'interaction-start threshold value'  (Formula 1)

It is preferable that the value of $t_1$ is set to about several minutes (for example, 2 to 5 minutes). Frequent questions asked at a short time interval on the same road can annoy the driver 102, while the driver 102 cannot be cautioned without questions asked at proper timings. It is also preferable that the value of $t_2$ is set to several seconds (for example, 5 seconds), since it is preferable that the driver 102 is cautioned promptly in case a hazardous state continues for several seconds.

The interaction-start threshold value of Formula 1 is stored as one piece of the safe driving information in the safe-driving information storing portion 109. In this Example, the interaction-start threshold value is set to "20". For example, in a case of traveling on a road whose speed limit is 60 km/h, the above-mentioned Formula 1 is established when the speed limit awareness information is "0" as the initial value and when the traveling speed exceeds 80 km/h. For determining whether the state where Formula 1 is established continues for at least the predetermined time ($t_2$), this Example requires a memory for storing the past driving state information (traveling speed in this Example), a counter for starting counting at the time the Formula 1 turns from an unestablished state to an established state, and the like.

When all of the above three conditions (a)-(c) are satisfied, the interaction controlling portion 106 decides that the interaction-start condition is satisfied in Op103, and goes on to Op104. The question generating portion 106b generates a question regarding the drive situation by referring to the question generation database 106f. The voice synthesizing-outputting portion 106c synthesizes the question as a voice and outputs the voice through the speaker 110. Here, the question generating portion 106b generates questions, for example, "How much is the speed limit?".

When the driver 102 answers with voice to this question such as "60 km" or "I do not know", the voice recognizing portion 106d recognizes this answering voice in Op106. And in Op107, the awareness information generating portion 107 decides whether the answer content is correct or not, on the basis of the answer content recognized by the voice recognizing portion 106d of the interaction controlling portion 106 and the information for speed limit stored as one piece of the safe driving information in the safe-driving information storing portion 109. That is, in this Example where the speed limit obtained as the safe driving information is 60 km/h, when the answer from the driver 102 is "60 km", the answer is decided as correct. When the answer is a value other than 60 km/h or "I do not know", it is decided as incorrect. Even when the answer of the driver 102 does not agree with the speed limit perfectly, the answer can be decided as correct if it is in a predetermined range approximate to the speed limit (for example, "50 km/h" or "70 km/h").

When the answer is decided as incorrect in Op107, in Op108, the awareness information generating portion 107 subtracts α from the value of the speed limit awareness information stored in the driver information storing portion 108. It should be noted that α=2 in this Example is just an example. The value α can be set properly in accordance with the value of the initial value $V_0$ or the like. In a case where the value of the speed limit awareness information reaches a predetermined lower limit ("−20" in this Example), it is preferable that the awareness information generating portion 107 does not decrease the value of the speed limit awareness information further even when the answer is decided as incorrect in Op107. If the value of the speed limit awareness information is lowered extremely, even when the driver 102 becomes aware of the speed limit later correctly, it will take time for the value of the speed limit awareness information to return to its normal range. This is quite annoying since the question in Op104 will be outputted frequently.

When the answer is decided as correct in Op107, in Op109, the awareness information generating portion 107 decides whether or not to update the value of the speed limit awareness information stored in the driver information storing portion 108, on the basis of the predetermined awareness updating condition. In this Example, it is regarded that the awareness updating condition is satisfied when an excess over the speed limit is within a predetermined range (for example, 20 km/h). By setting the awareness updating condition in this manner, the value of the speed limit awareness information will not be added in a case where an excess over the speed limit is out of a predetermined range even when the answer to the question regarding the speed limit is correct, namely, in a case where the vehicle runs at a speed exceeding considerably the speed limit irrespective of correct awareness of the speed limit.

In a case where the answer to the speed limit is correct and also an excess over the speed limit is within a predetermined range, in Op110, the awareness information generating portion 107 adds α to the value of the speed limit awareness information stored in the driver information storing portion 108. By increasing the value of the speed limit awareness information in this manner, the interaction-start condition (c) will not be established easily at the next time of executing Op103. That is, if the driver 102 is aware of the speed limit correctly and drives at a speed not considerably exceeding the speed limit, the value of the speed limit awareness information tends to increase. Thereby, the interaction-start condition in Op103 will not be satisfied easily, and frequency of questions from the drive support system 101 to the driver 102 is decreased. On the contrary, in a case where the answer to the question about the speed limit is incorrect, the value of the speed limit awareness information tends to decrease. As a result, the interaction-start condition in Op103 will be satisfied easily, and thus the frequency of questions from the drive support system 101 to the driver 102 is increased.

It is preferable, in a case where the value of the speed limit awareness information reaches a predetermined upper limit ("10" in this Example), that the awareness information generating portion 107 does not increase the value of the speed limit awareness information further even when it is decided in Op109 that the awareness updating condition is satisfied. When the value of the speed limit awareness information becomes extremely high, even if the driver 102 later falls in a sate not to be aware of the speed limit correctly, the interaction-start condition in Op103 will not be established easily, and the question in Op104 cannot be outputted at a proper timing.

Subsequently in Op111, the advice generating portion 106e refers to the advice generation database 106g, and generates proper advice corresponding to the driving state information. The advice can be notification advice for notifying a speed limit or an excess in speed, such as "The speed limit is . . . km/h." or "The excess in speed is . . . km/h.", and instructive advice such as "Check the speed limit after turning the intersection". That is, model sentences of such advice are stored previously in the advice generation database 106g, from which the advice generating portion 106e selects proper sentences according to the situations and incorporates in the sentences some numerical values or the like obtained from the driving state information or the safe driving information, thereby proper advice can be generated.

As mentioned above, according to this Example, the drive support system 101 asks the driver 102 about the speed limit at a proper timing, so that the awareness of the driver 102 with respect to the speed limit can be detected. Moreover, by updating the value of the speed limit awareness information in accordance with two decision results about the correctness of the answer of the driver 102 to the question (Op107) and satisfaction of the awareness updating condition (Op109), the timing for asking questions to the driver 102 can be adjusted properly.

In this Example, in Op109, it is regarded that the awareness updating condition will be satisfied when the excess is not more than a predetermined value, and that the value of the speed limit awareness information will be increased by a certain value α in Op110. However, the present invention will not be limited to this Example, but the relationship between the degree of the excess and the value of a can be expressed as a function without setting a particular awareness updating condition.

EXAMPLE 2

Example 2 is directed to a case where the drive support system 101 detects the awareness of the driver with respect to an inter-vehicle distance from a vehicle ahead.

The basic operation procedures of the drive support system 101 in this Example are illustrated in the flow chart of FIG. 3 and similar to those of Example 1. For avoiding duplicated explanation, the explanation for this Example is limited to parts different from Example 1.

In this Example, a level that the driver is aware of an inter-vehicle distance from a car ahead is defined as "inter-vehicle distance awareness", which is digitized as "inter-vehicle distance awareness information" and stored in the driver information storing portion 108. In this Example, the inter-vehicle distance awareness information has an initial value being set to "0" in Op101, and the value can be selected from the range of −20 to 10. It should be noted that this is just an example, and the embodiment of the present invention will not be limited to the specific examples. A larger value of the inter-vehicle distance awareness information indicates that the driver is aware of the inter-vehicle distance more correctly.

In the drive support system 101 of this Example, in Op102, the driving state detecting portion 105 outputs the value of the inter-vehicle distance obtained from the in-vehicle sensor 103 and the traveling speed, as the driving state information, to the interaction controlling portion 106 and the awareness information generating portion 107. For example, when the inter-vehicle distance is 50 m, the value of the driving state information is set to "50". In this Example, a recommendation value of the inter-vehicle distance corresponding to the traveling speed is stored as one piece of the safe driving information in the safe-driving information storing portion 109, in a form of table or in terms of functions.

In Op103, the interaction-start deciding portion 106a of the interaction controlling portion 106 defines the three conditions (a)-(c) below as the interaction-start conditions, and starts an interaction with the driver when all of these three conditions are satisfied.

(a) the inter-vehicle distance is insufficient
(b) a certain time ($t_1$) has passed from the last question
(c) the state where the following Formula 2 is established continues for at least a predetermined time ($t_2$)

('inter-vehicle distance'–'inter-vehicle distance recommendation value')–'inter-vehicle distance awareness information'≧'interaction-start threshold value'     (Formula 2)

Similarly to Example 1, it is preferable that the value of the above $t_1$ is set to several minutes (for example, 2 to 5 minutes) and the value of $t_2$ is set to several seconds (for example, 5 seconds).

Regarding the shortage of the inter-vehicle distance in the above condition (a), the interaction-start deciding portion 106a refers to the safe-driving information storing portion 109 on the basis of the traveling speed obtained as driving state information from the driving state detecting portion 105, and acquires a safe inter-vehicle distance recommendation value corresponding to the traveling speed. And it decides whether the above condition (a) is satisfied or not, by comparing the thus acquired inter-vehicle distance recommendation value and an actual inter-vehicle distance obtained similarly as driving state information from the driving state detecting portion 105.

The interaction-start threshold value in Formula 2 is also stored as one piece of the safe driving information in the safe-driving information storing portion 109. It is preferable that this interaction-start threshold value is stored as values varied corresponding to the traveling speed in a form of table or in terms of functions, but alternatively it can be across-the-board irrespective of the traveling speed. In this Example, the interaction-start threshold value is set to "20".

The interaction controlling portion 106 decides that the interaction-start condition is satisfied in Op103 in a case where all of the above three conditions (a)-(c) are satisfied, and goes onto Op104. In Op104, the question generating portion 106b generates questions such as "How many meters is the inter-vehicle distance?", "Is the inter-vehicle distance sufficient?", or "Do you keep the inter-vehicle distance of at least . . . km?".

When the driver 102 answers to such questions with voice, for example "100 meters", "Yes", or "I do not know", in Op106, the voice recognizing portion 106d recognizes the answering voice. And in Op107, the awareness information generating portion 107 decides whether the answer content is correct or not, on the basis of the answer content recognized by the voice recognizing portion 106d of the interaction controlling portion 106 and the driving state information obtained by the driving state detecting portion 105. In finding an answer of numerical values, similarly to Example 1, even when the driver's answer does not correspond perfectly with the correct answer, the answer can be decided as correct as long as the answer is within a certain range of values for the correct answer.

In a case where the answer is decided as incorrect in Op107, in Op108, the awareness information generating portion 107 subtracts α from the value of the inter-vehicle distance awareness information stored in the driver information storing portion 108. It should be noted that the numerical value of α=2 in this Example is just an example.

In a case where the answer is decided as correct in Op107, in Op109, the awareness information generating portion 107 decides whether or not to update the value of the inter-vehicle distance awareness information stored in the driver information storing portion 108 on the basis of the predetermined awareness updating condition. In this Example, in a case where a shortage of the inter-vehicle distance with respect to the inter-vehicle distance recommendation value is not more than a predetermined value (for example, 20 m), the awareness updating condition will be satisfied. By setting the awareness updating condition in this manner, in a case where the shortage with respect to the inter-vehicle distance recommendation value exceeds a predetermined value even when the answer to the question about the inter-vehicle distance is correct, that is, in a case where the driver drives the car in a state with insufficient inter-vehicle distance while being aware of the inter-vehicle distance recommendation value correctly, the value of the inter-vehicle distance awareness information will not be added.

In a case where the answer to the question about the inter-vehicle distance is correct and the shortage with respect to the inter-vehicle distance recommendation value does not exceed a predetermined value, in Op110, the awareness information generating portion 107 adds α to the value of the inter-vehicle distance awareness information stored in the driver information storing portion 108. In this manner, by increasing the value of the inter-vehicle distance awareness information, the interaction-start condition (c) will not be established easily at the next time of executing Op103. That is, when the driver 102 is aware of the inter-vehicle distance correctly and drives the car in a state that shortage of the inter-vehicle distance is not considerable, the value of the inter-vehicle distance information tends to increase, thereby the interaction-start condition in Op103 will not be satisfied easily, and the frequency of questions from the drive support system 101 to the driver 102 will be decreased. On the contrary, in a case where the answer to the question about the inter-vehicle distance is incorrect, the value of the inter-vehicle distance awareness information tends to decrease, thereby the interaction-start condition in Op103 will be satisfied easily, and the frequency of questions from the drive support system 101 to the driver 102 will be increased.

In this Example, advice in Op111 can be notification advice such as "Inter-vehicle distance is . . . meters." or "Inter-vehicle distance is insufficient.", and instructive advice such as "Inter-vehicle distance must be . . . meters for the current speed of . . . km/h." or "Extend the inter-vehicle distance by . . . meters.".

As mentioned above, according to this Example, the drive support system 101 asks the driver 102 about the inter-vehicle distance at a proper timing, thereby detecting the awareness of the driver 102 with respect to the inter-vehicle distance. And it updates the value of the inter-vehicle distance awareness information in accordance with the two decision results of whether the answers of the driver 102 to the questions are correct (Op107) and whether the awareness updating conditions are satisfied (Op109), thereby adjusting the timing for questions to the driver 102.

EXAMPLE 3

Example 3 is directed to a case where the drive support system 101 detects the driver's awareness with respect to the timing for operating a blinker (direction indicator). According to the Road Traffic Act, a driver should signal when the car gets to a point 30 m back from a point for making a right/left turn. In a case of changing the lane while advancing in the same direction (a case of making a lane change), the driver should signal 3 seconds earlier. The drive support system 101 of this Example detects whether the driver is aware of the timing for operating the blinker and performs correctly.

The basic operation procedures of the drive support system 101 in this Example are illustrated in the flow chart of FIG. 3 and similar to those of Example 1. For avoiding duplicated explanation, the explanation for this Example is limited to parts different from Example 1.

In this Example, a level that the driver is aware of the timing for operating the blinker is defined as "blinker operation awareness", which is digitized as "blinker operation awareness information" and stored in the driver information storing portion 108. In this Example, the blinker operation awareness information has an initial value being set to "0" in Op101, and the value can be selected from the range of −20 to 10. It should be noted that this is just an example, and the embodiment of the present invention will not be limited to the specific examples. A larger value of the blinker operation awareness information indicates that the driver is aware of the blinker operation timing more correctly.

In the drive support system 101 of this Example, in Op102, the driving state detecting portion 105 outputs the value of the blinker operation timing obtained from the in-vehicle sensor 103, as driving state information, to the interaction controlling portion 106 and the awareness information generating portion 107. For the case of making a right/left turn, the value of the blinker operation timing indicates how many meters back from the intersection for the right/left turn the driver operates the blinker. For example, when the driver operates the blinker 50 m back from the intersection for the right/left turn, the value of the driving state information is set to "50". Thereby, the driving state detecting portion 105 acquires, from the GPS included in the in-vehicle sensor 103, positional information at the moment that the blinker operation was conducted and also the positional information for the intersection where the car makes a right/left turn, and calculates the difference between the positional information as a blinker operation timing. Alternatively, without using the GPS information, the traveling distance from the position where the blinker operation was conducted to the position where the driver 102 steers the wheel for a right/left turn can be acquired from the in-vehicle sensor 103. In a case of a lane change, the value of the blinker operation timing indicates how many seconds before the lane change the driver 102 operates the blinker. For example, in a case where the driver steers the wheel for making a lane change 5 seconds after the blinker operation, the value of the driving state information is set to "5". The in-vehicle sensor 103 can detect whether the driver 102 steers the wheel to the right/left or to make a lane change, as a turning angle of the steering wheel.

In Op103, the interaction-start deciding portion 106*a* of the interaction controlling portion 106 defines the following conditions (a)-(c) as the interaction-start conditions, and it starts an interaction with the driver 102 when any one of these conditions is satisfied.

(a) the following Formula 3 is established at the time of making a right/left turn

|'blinker operation timing'−30|'blinker operation awareness information'≧'interaction-start threshold value' (Formula 3)

(b) the following Formula 4 is established at the time of making a lane change

|'blinker operation timing'−3|×10−'blinker operation awareness information'≧'interaction-start threshold value' (Formula 4)

(c) no blinker operation was performed before a right/left turn or a lane change Regarding the above conditions (a) and (b), in a case where there is another intersection within 30 m back from the intersection where the car made a right/left turn, preferably it is regarded that the interaction-start condition was satisfied irrespective of Formula 3 if the blinker operation was conducted before passing the other intersection, because in such a case, the blinker operation must be conducted after passing the other intersection. Information about the position of the intersection can be acquired from the map database 104 and the GPS of the in-vehicle sensor 103.

The interaction-start threshold values of Formulae 3 and 4 are also stored as pieces of the safe driving information in the safe-driving information storing portion 109. Though the interaction-start threshold value is set to "10" in this Example, the value will not be limited to this example.

The interaction controlling portion 106 decides that the interaction-start condition is satisfied in Op103 when any of the above conditions (a) to (c) is satisfied, and goes onto Op104. In Op104, the question generating portion 106*b* generates a question such as "Was the timing for operating the blinker proper?" or "Did you operate the blinker?".

When the driver 102 answers to such questions with voice such as "Yes", "Excellently", "A little too early" or "Too late", the voice recognizing portion 106*d* recognizes this answering voice in Op106. And in Op107, the awareness information generating portion 107 decides whether the answer content is correct or not, on the basis of the answer content recognized by the voice recognizing portion 106*d* of the interaction controlling portion 106 and the driving state information obtained by the driving state detecting portion 105.

For example, in a case where the driver 102 answers "Yes", "Excellently", or the like to a question "Was the operation timing for blinker proper?", the answer is correct when the value of the driving state information (blinker operation timing) is 30 at the time of making a right/left turn. At the time of making a lane change, the answer is correct when the value of the driving state information is 3. The issue that the proper blinker operation timing at a right/left turn is 30 and the issue that the proper blinker operation timing at a lane change is 3 are recorded previously on the safe-driving information storing portion 109, as a piece of the safe driving information. In this Example, similarly to Example 1, even if the answer of the driver 102 did not correspond perfectly to the correct answer, the answer can be decided as correct when the answer is within a predetermined range of numerical values of a correct answer.

When the driver 102 answers "Too early" to a question that "Was the blinker operation timing proper?", and when $\beta_1$ and $\beta_2$ denote predetermined integers (for example, $\beta_1=10$ and $\beta_2=1$), the value of the driving state information (blinker operation timing) of at least $30+\beta_1$ is regarded as correct at the time of making a right/left turn, and the value of the driving state information of at least $3+\beta_2$ is regarded as correct at the time of making a lane change. In a case where the driver 102 answered to the same question as "Too late", and when $\gamma_1$ and $\gamma_2$ denote predetermined values (for example, $\gamma_1=5$ and $\gamma_2=0.5$), the value of the driving state information (blinker operation timing) of not more than $30+\gamma_1$ is regarded as correct at the time of making a right/left turn, and the value of the driving state information of not more than $3+\gamma_2$ is regarded as correct at the time of making a lane change.

In a case where the answer is decided as incorrect in Op107, in Op108, the awareness information generating portion 107 subtracts α from the value of the blinker operation awareness information stored in the driver information storing portion 108. It should be noted that the value α=2 in this Example is just an example.

In a case where the answer is decided as correct in Op107, in Op109, the awareness information generating portion 107 decides whether or not to update the value of the blinker operation awareness information stored in the driver information storing portion 108, on the basis of a predetermined awareness updating condition. In this Example, for a case of making a right/left turn, it is regarded that the awareness updating condition is satisfied when the difference between a proper blinker operation timing and an actual blinker operation timing is not more than a predetermined distance (for example, 15 m). For a case of making a lane change, it is regarded that the awareness updating condition is satisfied when the difference between a proper blinker operation timing and an actual blinker operation timing is not more than a predetermined time (for example, 1.5 seconds). By setting the awareness updating condition in this manner, the value of the blinker operation awareness information will not be added in a case where the blinker operation timing differs materially from a proper timing even if the answer to the question about the blinker operation timing is correct, that is, in a case where the driver did not operate the blinker properly while being aware of the blinker operation timing correctly.

In a case where the answer to the question about the blinker operation timing is correct and where the difference between the proper blinker operation timing and the actual blinker operation timing is not more than a predetermined value, in Op110, the awareness information generating portion 107 adds α to the value of the blinker operation awareness information stored in the driver information storing portion 108. By increasing in the value of the blinker operation awareness information in this manner, the interaction-start conditions (a) and (b) will not be satisfied easily at the next time of executing Op103. That is, when the driver 102 is aware of the blinker operation timing properly and drives in a state where the proper blinker operation timing and the actual blinker operation timing do not differ materially from each other, the value of the blinker operation awareness information tends to increase. As a result, the interaction-start conditions in Op103 will not be satisfied easily, and the frequency of questions from the drive support system 101 to the driver 102 will be decreased. On the contrary, in a case where the answer to the question about the blinker operation timing is incorrect, the value of the blinker operation awareness information tends to decrease. As a result, the interaction-start conditions in Op103 will be satisfied easily, and the frequency of questions from the drive support system 101 to the driver 102 will be increased.

In this Example, the advice in Op111 can be notification advice such as "The timing for blinker operation was earlier by . . . meters." or "The timing for blinker operation was later by . . . seconds.", and instructive advice such as "Operate the blinker 30 m back from the intersection at a right/left turn" or "Operate the blinker 3 seconds before a lane change".

As mentioned above, according to this Example, the drive support system 101 asks questions about the blinker operation timing to the driver 102 at a proper timing, thereby detecting the awareness of the driver 102 with respect to the blinker operation timing. And it updates the value of the blinker operation timing awareness information in accordance with the two decision results of whether the answers of the driver 102 to the questions are correct or not (Op107) and whether the awareness updating conditions are satisfied or not (Op109), thereby adjusting properly the timing for questions to the driver 102.

EXAMPLE 4

Example 4 is directed to a case where the drive support system 101 detects the awareness of the driver with respect to a deceleration at the time of passing an intersection or a curve.

The basic operation procedures of the drive support system 101 in this Example are illustrated in the flow chart of FIG. 3 and similar to those of Example 1. For avoiding duplicated explanation, the explanation for this Example is limited to parts different from Example 1.

In this Example, a level that the driver is aware of the deceleration at the time of passing an intersection or a curve is defined as "deceleration awareness", which is digitized as "deceleration awareness information" and stored in the driver information storing portion 108. In this Example, the deceleration awareness information has an initial value being set to "0" in Op101, and the value can be selected from the range of −20 to 10. It should be noted that this is just an example, and the embodiment of the present invention will not be limited to the specific examples. A larger value of the deceleration awareness information indicates that the driver is aware of the deceleration more correctly at the time of passing an intersection or a curve.

In the drive support system 101 of this Example, in Op102, the driving state detecting portion 105 outputs the traveling speed obtained from the in-vehicle sensor 103, as driving state information, to the interaction controlling portion 106 and the awareness information generating portion 107. For example, when the traveling speed at a curve is 40 km/h, the value of the driving state information is set to "40". In this Example, as one piece of the safe driving information, recommendation values (recommended speeds) of safe traveling speeds corresponding to the steering wheel angle or the curve radius are stored in the safe-driving information storing portion 109, in a table form as shown in FIGS. 4(a) and 4(b). Such a table form is not a sole example, but a function expressing the relationship between either the steering wheel angle or the curve radius and the recommended speed can be stored as safe driving information in the safe-driving information storing portion 109. Since the recommended speed varies depending on the type and size of the car, it is preferable that a table or a function corresponding to the type and size of the car is stored previously in the safe-driving information storing portion 109.

In Op103, the interaction-start deciding portion 106a of the interaction controlling portion 106 defines the following conditions (a) and (b) as the interaction-start conditions, and it starts an interaction with the driver 102 when the two conditions are satisfied simultaneously.

(a) the car completed a right/left turn at an intersection or passed a curve
(b) the following Formula 5 is established:

('traveling speed'−'recommended speed')−'deceleration awareness information'≧'interaction-start threshold value' (Formula 5)

Decision about whether the above condition (a) is satisfied or not can be made on the basis of the information obtained from the map database 104 and the GPS of the in-vehicle sensor 103. With respect to the above (b), the interaction-start deciding portion 106a refers to the safe-driving information storing portion 109 on the basis of the steering wheel angle obtained from the driving state detecting portion 105 and the curve radius obtained from the map database 104 or the GPS of the in-vehicle sensor 103 as the driving state information, and acquires a safe recommended speed corresponding to the traveling speed. And it calculates a difference between the thus acquired recommended speed and the actual traveling speed obtained as driving state information from the driving state detecting portion 105, and further subtracts the deceleration awareness information from the difference, and compares the result with the interaction-start threshold value, thereby deciding whether the above-mentioned condition (b) is satisfied or not.

The interaction-start threshold value in Formula 5 also is stored as one piece of the safe driving information in the safe-driving information storing portion 109. The interaction-start threshold value is set to "20" in this Example, but the value is not limited to this example.

The interaction controlling portion 106 decides that the interaction-start condition is satisfied in Op103 in a case where the above two conditions (a) and (b) are satisfied simultaneously, and goes on to Op104. In Op104, the question generating portion 106 generates questions such as "Was the deceleration enough at the time of making a right turn (or a left turn or passing a curve)?".

When the driver 102 answers to the questions with voice such as "Yes", "Not enough", "No" or "I do not know", the voice recognizing portion 106d recognizes this answering voice in Op106. And in Op107, the awareness information generating portion 107 decides whether the answer content is correct or not, on the basis of the answer content recognized by the voice recognizing portion 106d of the interaction controlling portion 106, the driving state information (actual traveling speed) obtained by the driving state detecting portion 105 and the recommended speed.

For example, in a case where the driver 102 answers "Yes" to a question that "Was the deceleration enough at the time of making a right turn?", the awareness information generating portion 107 decides the answer as correct if the actual traveling speed did not exceed the recommended speed. In a case where the answer of the driver 102 is "No" or "Not enough", the awareness information generating portion 107 decides the answer as correct when the actual traveling speed exceeded the recommended speed. In a case where the answer of the driver 102 is "I do not know", the awareness information generating portion 107 decides the answer as incorrect irrespective of the actual traveling speed.

In a case where the answer is decided as incorrect in Op107, in Op108, the awareness information generating portion 107 subtracts α from the value of the deceleration awareness information stored in the driver information storing portion 108. It should be noted that the value α=2 in this Example is just an example.

In a case where the answer is decided as correct in Op107, in Op109, the awareness information generating portion 107 decides whether or not to update the value of the deceleration awareness information stored in the driver information storing portion 108, on the basis of a predetermined awareness updating condition. In this Example, it is regarded that the awareness updating condition is satisfied in a case where an excess of the actual traveling speed over the recommended speed is not more than a predetermined value (for example, 20 km/h). By setting the awareness updating condition in this manner, even if the answer to the question about the deceleration at an intersection or a curve is correct, the value of the deceleration awareness information will not be added in a case where the actual traveling speed exceeded considerably the recommended speed at an intersection or a curve.

In a case where the answer to the question about the deceleration at an intersection or a curve is correct and where the actual traveling speed did not exceed considerably the recommended speed at an intersection or a curve, in Op110, the awareness information generating portion 107 adds α to the value of the deceleration awareness information stored in the driver information storing portion 108. By increasing the value of the deceleration awareness information in this manner, the interaction-start condition (b) will not be established easily at the next time of executing Op103. That is, when the driver 102 is aware of the deceleration at an intersection or a curve properly and drives in a state not exceeding considerably the recommended speed at an intersection or a curve, the value of the deceleration awareness information tends to increase. As a result, the interaction-start conditions in Op103 will not be satisfied easily, and the frequency of questions from the drive support system 101 to the driver 102 will be decreased. On the contrary, in a case where the answer to the question about the deceleration at an intersection or a curve is incorrect, the value of the deceleration awareness information tends to decrease. As a result, the interaction-start conditions in Op103 will be satisfied easily, and the frequency of questions from the drive support system 101 to the driver 102 will be increased.

In this Example, the advice in Op111 can be notification advice such as "The passage speed at the intersection (or the curve) is greater by . . . km/h than the safe speed.", and instructive advice such as "The safe passage speed at the intersection (or curve) you have just passed is . . . km/h.".

As mentioned above, according to this Example, the drive support system 101 asks questions about the deceleration at an intersection or a curve to the driver 102 at a proper timing, thereby detecting the awareness of the driver 102 with respect to the deceleration at an intersection or a curve. And it updates the value of the deceleration awareness information in accordance with the two decision results of whether the answer of the driver 102 to the question is correct or not (Op107) and whether the awareness updating condition is satisfied or not (Op109), thereby adjusting properly the timing for questions to the driver 102.

The above Examples 1-4 are described as more specific examples of the present invention. In performing the present invention, any one of the above Examples 1-4 can be applied alone, or two or more of Examples 1-4 can be combined. That is, a decision is made on whether the interaction-start conditions are satisfied or not, with respect to at least two of the four evaluation items including the traveling speed (evaluation item in Example 1), the inter-vehicle distance (evaluation item in Example 2), the blinker operation timing (evaluation item in Example 3) and the deceleration at an intersection or a curve (evaluation item in Example 4). In a case where the interaction-start condition is satisfied for any of the evaluation items, an interaction for the evaluation item can be started. In this case, when plural evaluation items satisfy their interaction-start conditions at the same time, it is preferable that the interaction is started in an order that the difference between the calculation result in the left side and the interaction-start threshold value in the right side in any of Formulae 1-5 in the interaction-start conditions is the largest. Alternatively the interaction can be started only for the evaluation item where the difference is the largest. In this manner, it is possible to start preferentially the interaction regarding the evaluation item for which the awareness of the driver is the lowest.

In each of Examples, the interaction-start condition is set on the basis of the driving state information. Alternatively, it is also preferable that a configuration for detecting a sign of dozing of the driver is provided so that a decision is made that the interaction-start condition is satisfied when the sign of the dozing is detected. The sign of dozing can be detected, for example, by detecting the number of eye blinks of the driver 102 by means of a camera provided as the in-vehicle sensor 103, or by detecting the fluctuation of heartbeat or the like of the driver 102 by means of a heartbeat sensor provided as the in-vehicle sensor 103. In this case, it is preferable that the drive support system 101 asks the driver 102, in Op104, about the speed limit, the inter-vehicle distance or the like. In this case, it is also preferable that the question is repeated by the time there is an answer from the driver 102 so as to wake up the driver 102.

It is also preferable that information about an intersection or a curve at which many traffic accidents occur is registered previously in either the map database 104 or the safe-driving information storing portion 109, and that when passing the point, as an interaction-start threshold value regarding the deceleration at an intersection or a curve (the evaluation item in Example 4), a value smaller than a normal one is set. Thereby, the interaction-start condition is satisfied easily at a point where many traffic accidents occur, and the attention of the driver 102 toward safe driving can be attracted by the interaction.

It is also preferable that the information in the map database 104 or the safe-driving information storing portion 109 is updated through recent recording media such as a network connection and CD-ROM, in accordance with changes of the database for traffic regulations, safety standards and accidental cases. Thereby, information on changes of the speed limit for a road or points at which many traffic accidents occur, for example, can be updated.

It is also preferable that, when the drive is ended, the drive support system 101 provides the driver 102 with advice regarding the drive, in accordance with changes of the awareness information or the like during the drive. In this case, a history of update of the awareness information or a history of the driving state information during the drive should be stored in the driver information storing portion 108 or any other storing portion of the drive support system 101. Ending of the drive can be determined, for example, by detecting arrival of the car at a location (for example, the home) set to the final destination by the GPS. When determining that the drive is ended, the drive support system 101 provides advice regarding the drive in accordance with the changes in the awareness during the drive, unconditionally, or corresponding to a request from the driver 102 for advice. The advice can be provided as a synthesized voice. Alternatively, since the automobile has been stopped by that time, the advice can be indicated on a display of the drive support system 101, without use of the voice interaction.

Advice presented by the drive support system 101 to the driver is not limited particularly, but the examples can be "Attention to the speed limit was improved in drive today." or "Attention to the speed limit was lower than before (3 days ago)", in accordance with the changes of the awareness information in that day or in the several days. Alternatively for example, in a case where the value of the speed limit awareness information tends to decrease, presenting just a simple advice such as "Pay attention to speed limit." is effective to call the attention of the driver 102 to safe driving.

It is also preferable that the drive support system 101 stores the statistics of the respective evaluation items as the driver information in the driver information storing portion 108 or any other storing portion of the drive support system 101 and presents the statistics to the driver. For example, regarding the awareness information for the speed limit, the average excess in speed, the number of excess, time zones where an excess in speed often occurs, or the like, can be presented on a display or the like of the drive support system 101.

In Examples 1-4, even when the interaction-start condition is satisfied in Op103, it is preferable that the start of the interaction is held in a case where the driving operation of the driver 102 is complicated during swerving the wheel or during passing an intersection in order not to divert attention of the driver.

Although the present invention is supposed to be applied to automobiles in the respective embodiments, the present invention can be applied also to support drives of arbitrary movable bodies such as trains, ships, airplanes and the like.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A drive support apparatus for a movable body, comprising:
  a driving state detecting portion for acquiring driving state information comprising at least either information about a traveling situation of the movable body or information about a driving operation of a driver of the movable body, from a sensor provided in the movable body during a drive of the movable body by the driver;
  a driver information storing portion for storing awareness information that represents a digitized awareness of the driver indicating how much the driver is aware of a regulated or recommended driving condition for safe driving of the movable body;
  an interaction controlling portion configured to,
    decide whether to start an interaction with the driver based on whether the driving state information and the awareness information satisfy a predetermined interaction-start condition;
    generate a question to check the driver's awareness that indicates how much the driver is aware of a regulated or recommended driving condition for safe driving in the case of a decision to start the interaction;
    output the generated question as a synthesized voice;
    recognize an answer content from a voice of the driver to the question;
    generate advice for safe driving in response to the answer; and
    output the generated advice as a synthesized voice;
  an awareness information generating portion for updating the awareness information in accordance with the answer content recognized by the interaction controlling portion; and
  a safe-driving information storing portion for storing safe driving information comprising information that represents a condition for safe driving,
  wherein the awareness information generating portion decides whether the answer content recognized by the interaction controlling portion is correct or not, on the basis of the answer content and the safe driving information;
  when the answer content is decided as correct, awareness information generating portion decides whether or not to update the awareness information stored in the driver information storing portion depending on the answer content and the driving state information satisfy a predetermined awareness information updating condition, and in a case of a decision that the awareness information should be updated, the awareness information generating portion updates the awareness information to a value representing a state of a higher awareness, and when the answer content is decided as incorrect, the awareness information generating portion updates the awareness information stored in the driver information storing portion to a value representing a state of a lower awareness.

2. The drive support apparatus for a movable body according to claim 1, wherein the movable body is an automobile.

3. The drive support apparatus for a movable body according to claim 2,
wherein the awareness denotes a level of awareness of the driver with respect to a speed limit, and
the driving state detecting portion acquires a traveling speed of the movable body, as driving state information from the sensor of the movable body.

4. The drive support apparatus for a movable body according to claim 2,
wherein the awareness information denotes a level of awareness of the driver with respect to an inter-vehicle distance, and
the driving state detecting portion acquires an inter-vehicle distance from a movable body ahead, as driving state information from the sensor of the movable body.

5. The drive support apparatus for a movable body according to claim 2,
wherein the awareness information denotes a level of awareness of the driver with respect to a timing for operating a direction indicator, and
the driving state detecting portion acquires information that represents a timing for operating the direction indicator, as driving state information from the sensor of the movable body.

6. The drive support apparatus for a movable body according to claim 2,
wherein the awareness information denotes a level of awareness of the driver with respect to a deceleration at a time of passing a curve or an intersection, and
the driving state detecting portion acquires a traveling speed at a time of passing the curve or the intersection, as driving state information from the sensor of the movable body.

7. The drive support apparatus for a movable body according to claim 2,
wherein the awareness denotes a level of awareness of the driver respectively with respect to at least two evaluation items selected from the group consisting of four evaluation items of a speed limit, an inter-vehicle distance, a timing for operating a direction indicator, and a deceleration at a time of passing a curve or an intersection;
corresponding to the evaluation items, the driving state detecting portion acquires driving state information of at least two from the speed limit of the movable body, the inter-vehicle distance from a movable body ahead, the timing for operating a direction indicator, and the deceleration at the time of passing a curve or an intersection, from the sensor of the movable body; and
once plural evaluation items satisfy simultaneously the interaction-start conditions, the interaction controlling portion generates a question for checking the awareness with respect to an evaluation item for which the driver's awareness has been determined as the lowest.

8. The drive support apparatus for a movable body according to claim 1,
wherein the sensor comprises a sensor for detecting a sign of dozing of the driver, and
when the dozing of the driver is detected by the sensor, the interaction controlling portion starts an interaction with the driver irrespective of satisfaction of the interaction-start conditions.

9. A recording medium on which a program is recorded, the program allows a computer to execute:
a driving state detection procedure for acquiring driving state information comprising at least either information about a traveling situation of the movable body or information about a driving operation of a driver of the movable body, from a sensor provided in the movable body during a drive of the movable body by the driver;
an interaction control procedure to,
refer to a driver information storing portion that stores awareness information representing digitized awareness of the driver indicating how much the driver is aware of the a regulated or recommended driving condition for safe driving;
decide whether to start an interaction with the driver depending on whether the driving state information and the awareness information satisfy a condition to start the interaction; generate a question for checking the driver's awareness indicating how much the driver is aware of a regulated or recommend driving condition for safe driving in a case a decision to start the interaction;
output the generated question as a synthesized voice;
recognize an answer content from a voice of the driver to the question;
generate advice for safe driving in response to the answer; and
output the generated advice as a synthesized voice; and
awareness information generation procedure to update the awareness information in accordance with the answer content recognized through the interaction control procedure,
wherein the awareness information generation procedure includes the processing to decide whether the answer content recognized by the interaction controlling portion is correct or not, on the basis of the answer content and a safe driving information that represents a condition for safe driving and is stored in a safe-driving information storing portion;
when the answer content is decided as correct, it is decided whether or not to update the awareness information stored in the driver information storing portion depending on whether the answer content and the driving state information satisfy a predetermined awareness information updating condition, and in a case of a decision that the awareness information should be updated, the awareness information is updated to a value representing a state of a higher awareness, and
when the answer content is decided as incorrect, the awareness information stored in the driver information storing portions updated to a value representing a state of a lower awareness.

* * * * *